United States Patent [19]
Jouppi et al.

[11] Patent Number: 6,112,318
[45] Date of Patent: *Aug. 29, 2000

[54] PERFORMANCE COUNTERS CONTROLLED BY PROGRAMMABLE LOGIC

[75] Inventors: Norman P. Jouppi, Palo Alto, Calif.; Joel J. McCormack, Boulder, Colo.; Larry D. Seiler, Boylston; Mark O. Yeager, West Groton, both of Mass.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,403

[22] Filed: Aug. 11, 1997

[51] Int. Cl.$^7$ .......................... H02H 3/05; H03K 19/003; H04B 1/74
[52] U.S. Cl. ................. 714/47; 714/39; 714/704
[58] Field of Search ................ 714/47, 45, 34, 714/37, 39, 704

[56] References Cited

U.S. PATENT DOCUMENTS

| | | |
|---|---|---|
| 4,835,736 | 5/1989 | Easterday ................. 711/218 |
| 5,237,684 | 8/1993 | Record et al. ............ 395/682 |
| 5,557,548 | 9/1996 | Gover et al. ............. 702/176 |
| 5,657,253 | 8/1997 | Dreyer et al. ............ 702/186 |
| 5,675,729 | 10/1997 | Mehring ................. 702/190 |
| 5,680,644 | 10/1997 | Sager ..................... 710/52 |
| 5,796,637 | 8/1998 | Glew et al. .............. 702/190 |
| 5,799,178 | 8/1998 | Walker et al. ........... 713/601 |

Primary Examiner—Dieu-Minh T. Le
Attorney, Agent, or Firm—Pennie & Edmonds LLP

[57] ABSTRACT

An apparatus and method for counting event signals generated by a computer system is described. The event signals are indicative of the performance of the computer system. Programmable logic enhances the functionality of performance counters by enabling the system user to specify, during the execution of an application program, which event signals to count. The system user can dynamically configure the programmable logic to select a subset of the event signals generated by the computer system, and to combine the selected subset of event signals to generate a new event signal that can be counted. Other new event signals can be generated by the programmable logic from the selected subset of event signals. A user of the computer system can dynamically make the selection of any one of the new event signals for counting.

20 Claims, 7 Drawing Sheets

PERFORMANCE COUNTERS CONTROLLED BY PROGRAMMABLE LOGIC

FIELD OF THE INVENTION

The present invention relates generally to computer systems, and more particularly to monitoring the performance of computer systems.

BACKGROUND OF THE INVENTION

Computer systems are becoming increasingly more complex. This growing complexity increases the difficulty of analyzing and understanding the dynamic behavior of the systems. When computer systems are built with low integration components, hardware monitoring techniques are able to access and analyze signals of interest for understanding the operation and performance of the systems. But as computer systems become more complex and highly integrated, these signals of interest can become inaccessible, many times being sealed within the packages of the components.

Moreover, simulations of computer system behavior are incapable of providing a complete understanding of the performance of the system. For one, such simulations run at significantly lower speeds than actual computer system operation. Consequently, these simulations are unable to run large real applications within a useful period of time. Further, the simulations cannot aid in understanding flaws that are produced during the implementation of the design or during the manufacture of the computer system.

In order to provide a window of visibility into the behavior of computer systems, microprocessors have begun to include on-chip performance counters for counting occurrences of important events during system operation. Important events can include, for example, cache misses, instructions executed, and I/O data transfer requests. These counters can be set to interrupt the microprocessor upon a count overflow. Typically, the microprocessors can also periodically examine the performance counters, and thereby evaluate the performance of the system.

Recent implementations of on-chip performance counters supply each performance counter a distinct set of events from which only one event is selected for counting. Such implementations are limited in that each particular event can be selected by only one performance counter. Also, the selection of which events to count, typically, must be determined at the time when the computer system is designed. Unfortunately, not all computer system performance problems can be anticipated at design time, especially those problems that arise because something has been overlooked. Thus, selecting events at design time can limit performance monitoring to those events that are of no interest to the system designer in light of the actual behavior of the computer system.

Thus, it is desired that there be a method and apparatus for counting event signals that enable the system user to specify, while an application program is running, which events signals to count.

SUMMARY OF THE INVENTION

The present invention resides in an apparatus and related method for counting event signals generated by a computer system. It is an object of the invention to enhance the functionality of performance counters by using programmable logic. With the programmable logic the system user can specify, while an application program is running, which event signals to count.

Another object of the invention is to provide flexibility in what types of events can be counted. The present invention can generate new event signals from combinations of event signals that are generated by the computer system. These combinations can be dynamically determined during the operation of the computer system.

Yet another object of the invention is to be able to count multiple concurrent occurrences of an event type in a single counter.

In terms of the disclosed apparatus, the invention includes means for selecting a subset of event signals from a set of event signals generated by a computer system, and means for combining the selected subset of event signals to generate a new event signal that can be counted.

In one aspect of the apparatus, the means for selecting is dynamically configurable. A new subset of event signals can be selected, while the computer system is operating, from the set of event signals generated by the computer system.

In another aspect of the apparatus, the selected subset of event signals includes a first event signal and a second event signal. The means for combining generates the new event signal when the computer system generates the first event signal and the second event signal during a single clock cycle.

In yet another aspect, the first event signal and the second event signal occur concurrently, and each indicate an occurrence of a particular event. The means for combining combines the first event signal and the second event signal so that each concurrent occurrence of the particular event can be counted in one counter during a single clock cycle.

In still yet another aspect, the first event signal and the second event signal occur in different clock cycles, and the means for combining generates the new event signal when the computer system generates the second event signal after generating the first event signal.

In terms of the disclosed method, the invention selects a subset of event signals from a set of event signals generated by a computer system, and combines the selected subset of event signals to generate a new event signal that can be counted.

In one aspect, the method selects dynamically, while the computer system is operating, a new subset of event signals from the set of event signals generated by the computer system.

In another aspect, the method generates a plurality of new event signals from the selected subset of event signals, and selects one of the new event signals to count.

In yet another aspect, the method selects dynamically, while the computer system is operating, a different one of the new event signals to count.

Other and further aspects of the present invention will be more fully appreciated by considering the following description and by reference to the accompanying drawings.

BRIEF DESCRIPTION OF THE DRAWINGS

An embodiment of the invention will be described with reference to the accompanying drawings, in which.

DETAILED DESCRIPTION OF A PREFERRED EMBODIMENT

Figure 1:
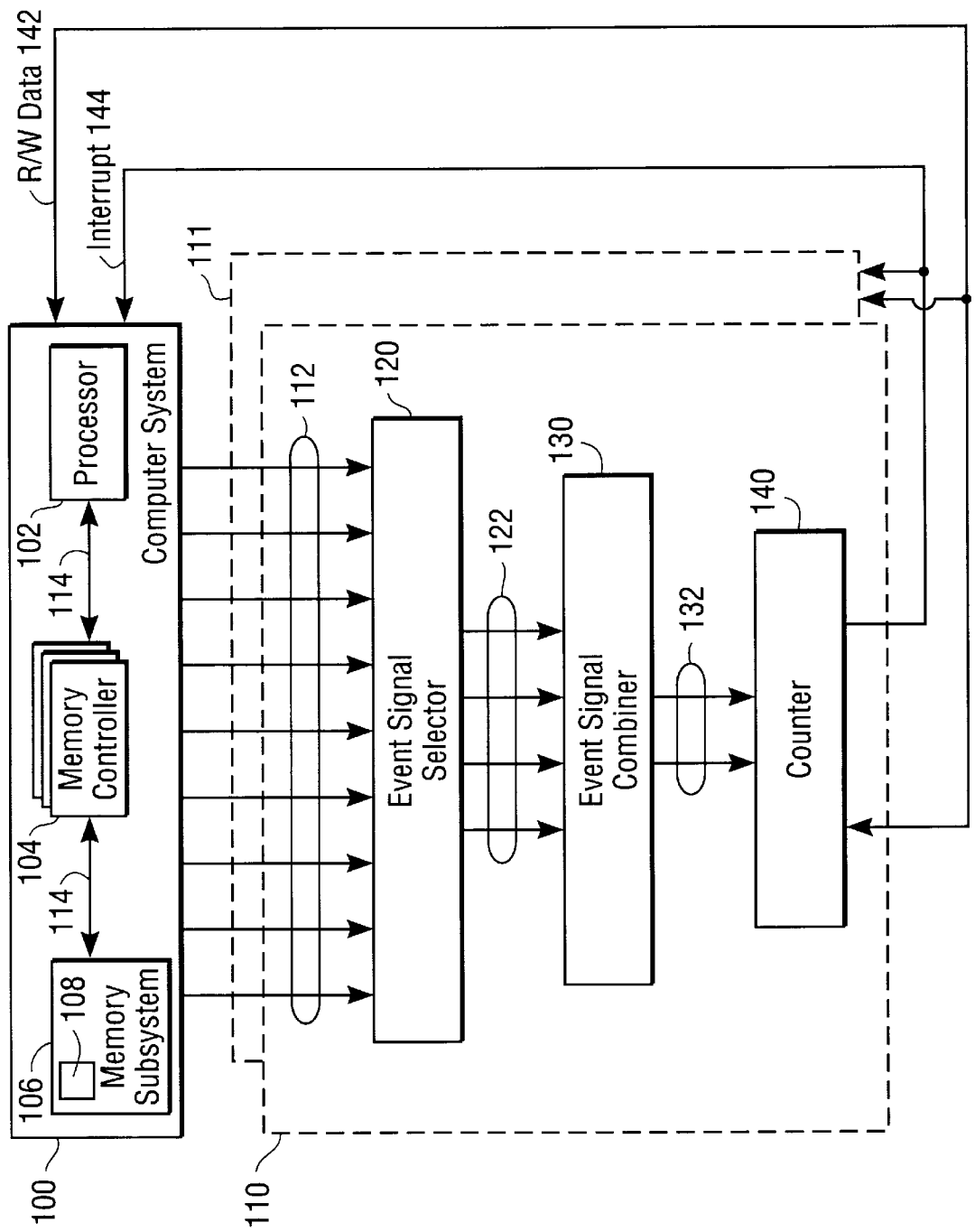
FIG. 1 is a block diagram of a computer system and performance counter units that count event signals according to the principles of the invention.

FIG. 1 shows a computer system 100 coupled to performance counter units 110, 111 by signal lines 112. The signal lines 112 carry event signals that are generated during the operation of the computer system 100. Such event signals 112 are used to monitor the performance of the system 100 according to the principles of the invention.

The computer system 100 includes a processor 102, memory controllers 104 and a memory subsystem 106. The processor 102 is coupled to the memory subsystem 106 through the memory controllers 104 by a memory bus 114. The computer system 100 can be one of a variety of computer system types including, for example, an embedded system, a personal computer, a workstation, or a mainframe.

In a preferred embodiment, the processor 102 is a graphics rendering device, but the principles of the invention can also be implemented using modern integrated circuit microprocessor devices having either CISC or RISC architectures. The processor 102, memory controllers 104 and performance counter units 110, 111 are implemented on a single integrated circuit (IC) device.

The memory controllers 104 control access to the data stored in the memory subsystem 106. The processor 102 can have as many as eight memory controllers 104, which are organized, for example, into one of two groups. For the purposes of this description, the eight memory controllers 104 are numbered 0 through 7. As described below in connection with FIG. 2, such grouping can be dynamically configured by the system 100 user during the execution of an application program. Such configuring is referred to as dynamic because the configuring occurs during the operation of the computer system 100.

Other embodiments can use fewer or more than two performance counter units 110, 111 and eight memory controllers 104. There can also be fewer or more than two groups of such memory controllers 104.

The memory subsystem 106 includes memories 108 that have various attributes, such as static, dynamic, random access, volatile, and persistent storage elements. These storage elements can be, for example, registers or memory cells. The memories can be organized variously, such as in a cache hierarchy or in an memory array. The busses 114 can be implemented as a plurality of signal lines for carrying address, data, and control signals.

The performance counter unit 110 is a representative example of each unit 110, 111 in the computer system 100. The performance counter unit 110 receives the same set of event signals 112 as performance counter unit 111. The performance counter unit 110 includes an event signal selector 120, and event signal combiner 130 and counter 140. The event signal selector 120 receives event signals 112 from the computer system 100 and issues signals 122 to the event signal combiner 130. The event signal combiner 130 is coupled to the counter 140 by signals 132. The counter 140 is coupled to the computer system 100 by read/write (R/W) data lines 142 and interrupt lines 144.

During the operation of the computer system 100, the processor 102 executes instructions of an application program. Analyzing the behavior of the computer system 100 as the processor 102 executes instructions can provide helpful insight as to the design limits, flaws and characteristics of the computer system 100, and the processor 102 itself. System designers determine beforehand what types of system conditions might be of some interest to monitor, and design the computer system 100 to trigger event signals 112 when those conditions occur. Examples of operational conditions that can trigger an event signal 112 are described below in connection with FIG. 2 and the TABLES A, B, C and D.

Various components in the computer system 100 including, for example, the memory controllers 104, are capable of producing event signals 112. The types of events that can be signaled depend upon the signaling component.

When a certain condition triggers an event signal 112, the computer system 100 generates a high ("1") signal on the appropriate event signal line 112. If that certain condition does not occur during a system clock cycle, then the system 100 outputs low ("0") signal.

The performance counter unit 110 receives a set of event signals 112 generated by the computer system 100 during each system clock cycle. Each other performance counter unit 111 receives the same set of event signals 112 as the performance counter unit 110. The event signal selector 120 selects a subset of event signals 122 from the set of event signals 112 generated by the computer system 100. A system 100 user can dynamically configure the event signal selector 120, while the computer system 100 is operating, to select a subset of zero, one or more event signals 122 from the set 112 generated by the computer system 100.

The event signal combiner 130 receives the event signals 122 of the subset selected by the event signal selector 120, and combines these signals 122 to produce new event signals 132 that can be added to the counter 140. An accumulated count associated with the new event signals 132 is maintained in the counter 140. The counter 140 issues an interrupt signal on interrupt line 144 when the accumulated count overflows the counter 140. The processor 102 can periodically examine the counter 140 via R/W data lines 142 to obtain an ongoing analysis of the performance of the computer system 100 with respect to the new event signals 132. The processor 102 can also write to the counter 140, such as to preset the counter 140 to a predetermined value.

Figure 2:
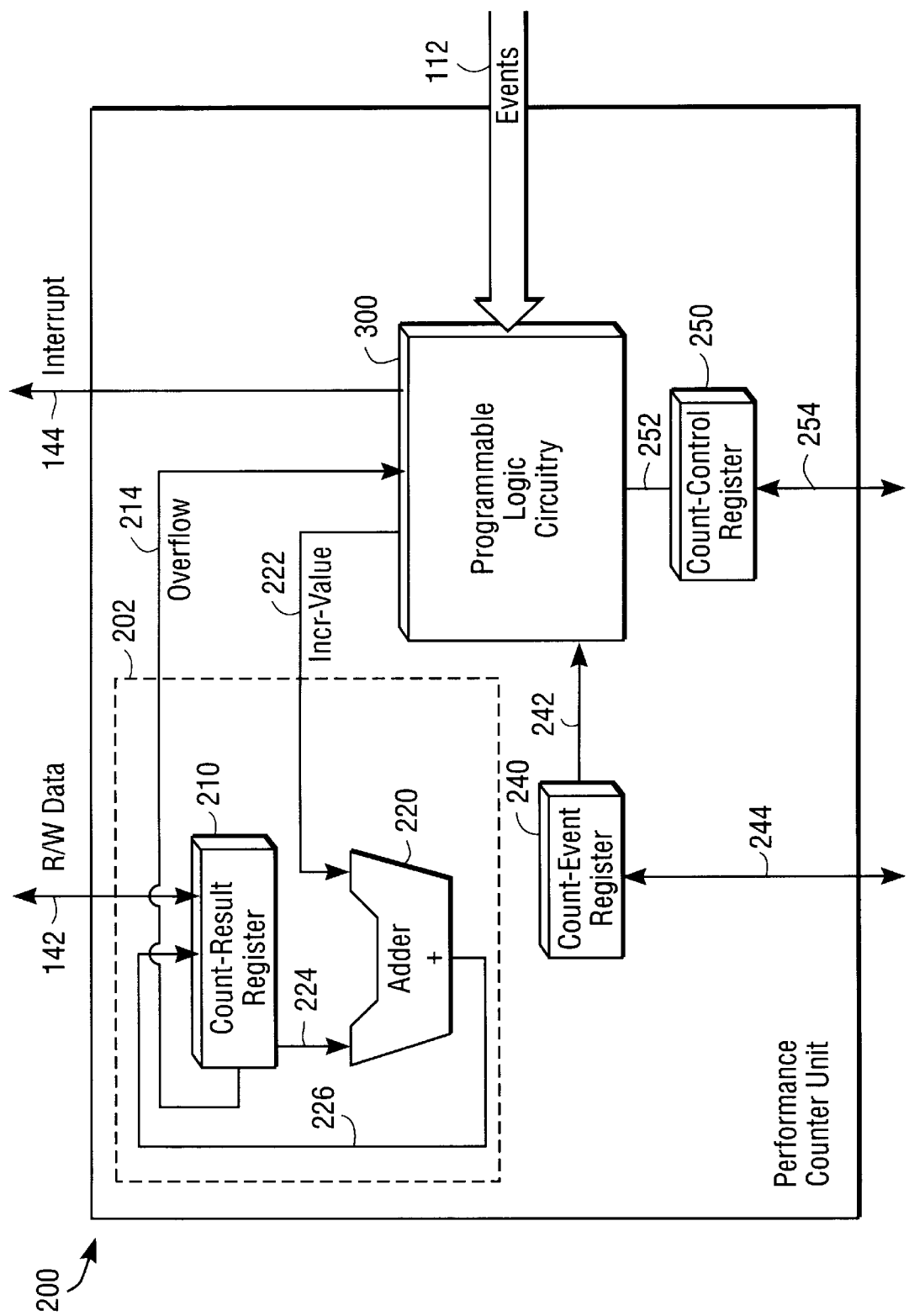
FIG. 2 is a block diagram of one of the performance counter units of FIG. 1 including programmable logic circuitry.

FIG. 2 shows performance counter unit 200 as a representative example of each performance counter unit 110, 111 in the computer system 100. Event signals 112 are presented to each performance counter unit 110, 111.

Sending the same set of events to each performance counter unit 110, 111 is a divergence from prior art performance counter implementations. Previous implementations usually sent all related events to one counter, i.e., all memory-related events went to one counter, all instruction related events to another counter, etc. Then one of the related events was selected for counting. The problem was that such implementations precluded making comparisons between related events within a single execution of an application program.

There is a need, however, for performance counter mechanisms that will allow comparisons between related events.

For example: it might be useful to count not only cache misses, but also to determine what percentage of those cache misses were caused by load instructions. If event signals for both cache misses and load misses are sent to the same counter, then only one of either cache misses or load misses can be monitored during any given execution of an application. But, if the event signals for both cache misses and load misses are sent to each performance counter unit 110, 111, as is possible in the preferred embodiment, then cache misses can be counted by one unit 110, and load misses by the other unit 111. The processor 102 can then determine the ratio of cache misses due to load instructions after a single execution of the program application. This is difficult to do with the previous implementations.

Accordingly, the performance counter unit 200 includes a performance counter 202, a count-event register 240, a count-control register 250, and programmable logic circuitry 300. The performance counter 202 includes a count-result register 210 coupled to an adder 220 by which an accumulated count in the count-result register 210 can be incremented. This count is associated with new event signals 132 that are generated according to the principles of the invention. The processor 102 can read from or write to the count-result register 210 via R/W data lines 142. The count-result register 210 is also coupled to the programmable logic circuitry 300 by overflow line 214. The programmable logic circuitry 300 may interrupt the processor 102 via interrupt line 144 upon certain counts or conditions, such as when the count-result register 210 overflows.

The preferred embodiment uses a sixty-four bit count-result register 210. The sixty-four bit size of the register 210 can accommodate a large count (2^64) before overflowing, which can reduce the frequency at which the processor 102 needs to read the count-result register 210 than would be needed for a smaller counter.

The adder 220 includes two inputs and one output: one input is for receiving the current count from the count-result register 210 via signal lines 224, and the other input is for receiving an incrementing value (INCR-VALUE) from the programmable logic circuitry 300 via signal lines 222. The output of the adder 220, which is the sum of the values on signal lines 222 and 224, is fed back to the count-result register 210. INCR-VALUE 222 determines the amount by which the current count stored in the count-result register 210 increases. This amount can be greater than one.

In the preferred embodiment, the combined settings of the count-event register 240 and the count-control register 250 determine whether, and by what amount the performance counter 202 increments. Such settings can be determined at the run time of an application program. Writing a '1' to certain bit positions in the count-event register 240 and the count-control register 250 selects events and functions corresponding to those bits as shown below in TABLEs A, B, C, and D.

The count-event register 240 is coupled to the programmable logic circuitry 300 by signal lines 242, and, generally, specifies the subset of event signals 122 to be selected. Zero, one or more events can be selected concurrently. A user of the system 100 can dynamically configure the count-event register 240 during the execution of an application program. The processor 102 can access the count-event register 240 for reading and writing by signal lines 244.

In the preferred embodiment, the count-event register 240 has 64-bits. The bits correspond to particular event signals 112 generated by the computer system 100. Each event signal 112 has at least one bit in the count-event register 240 that is associated with that event signal. When a bit is set to a "1" value, the corresponding event signal is selected. As shown below, multiple bits may be used to select a particular event signal. TABLE A shows the correspondence between the bits of the count-event register 240 and event signals 112 generated by the computer system 100.

As shown in TABLE A, the first eight bits 7:0 are used to place each of eight memory controllers into one of two groups. For example, bit 7 corresponds to memory controller #7, bit 6 to memory controller #6, and so forth. Thus, if bits 7:0 are written as [0000 0010$_2$], for example, then all of the memory controllers 104, but memory controller #1, are in group 0 (see TABLE A). The ability to group memory controllers allows the system 100 user to isolate the behavior of one particular memory controller, or to concurrently monitor the collective behavior of several controllers. Because the count-event register 240 can be dynamically programmed, the grouping of the memory controllers can occur anytime after an application program starts executing.

Bits 23:8 are used to select memory controller events. Bits 15:8 determine which event signals triggered by group-0 memory controllers will be selected. Similarly, bits 23:16 apply to group-1 memory controllers. In the preferred embodiment, there are four defined event types: Memory Queue, Memory-State, Read Queue and Memory Function. Two bits are used to select an event within an event type for performance monitoring. For example, if the bits 15:8 of count-event register 240 are set to [0000 0100$_2$], then the INACTIVE MEM-STATE event for group 0 memory controllers is selected (see TABLES A and B). TABLE B shows the correspondence between the values of bits 23:8 and the selected memory controller events.

Bits 63:24 can select other types of computer system 100 events. Examples of such events that are useful to count can include events based upon the states of various queues in the computer system 100. Other events can also include the status of certain components of the computer system 100, such as a bus interface logic or a command parser or direct memory access (DMA) controller, whether such components are active or idle.

TABLE A

| BITS | FIELD | FIELD DESCRIPTION |
| --- | --- | --- |
| 7:0 | GROUP | Each bit corresponds to a memory controller and indicates whether that memory controller is part of group 0 or group 1. |
| 15:8 | Function-0 | The bits define an event function that can be selected for Group 0 memory controllers. |
| 23:16 | Function-1 | The bits define an event function that can be selected for Group 1 memory controllers. |
| 63:24 | Events | The bits correspond to events that can be incrementally counted. |

TABLE B

| BITS | EVENT TYPE | EVENT DESCRIPTION |
|---|---|---|
| 1:0 | MEMORY-QUEUE | MEMORY QUEUE EVENTS |
| 00 | NONE | DO NOT SELECT A MEMORY-QUEUE EVENT. |
| 01 | EMPTY | ALL PIXEL QUEUES ARE EMPTY. |
| 10 | PARTIAL | AT LEAST ONE PIXEL QUEUE IS NOT EMPTY. |
| 11 | FULL | THE FIRST PIXEL QUEUE IS FULL. |
| 3:2 | MEMORY-STATE | MEMORY STATE EVENTS. |
| 00 | NONE | DO NOT SELECT A MEMORY-STATE EVENT. |
| 01 | INACTIVE | THE MEMORY CONTROLLER IS IDLE. |
| 10 | OVERHEAD | MEMORY CONTROLLER EXECUTES A NON-DATA CYCLE. |
| 11 | ACTIVE | MEMORY CONTROLLER IS READING OR WRITING DATA. |
| 5:4 | READ-QUEUE | READ QUEUE EVENTS |
| 00 | NONE | DO NOT SELECT A READ-QUEUE EVENT. |
| 01 | EMPTY | READ ADDRESS AND READ DATA QUEUES ARE EMPTY. |
| 10 | PARTIAL | READ ADDRESS OR READ DATA QUEUE IS NOT EMPTY. |
| 11 | FULL | THE READ ADDRESS QUEUE IS FULL. |
| 7:6 | MEMORY-FUNCTION | COMBINED MEMORY CONTROLLER EVENTS. |
| 00 | OR | ANY ONE OF THE SELECTED EVENTS IS TRUE. |
| 01 | AND | ALL OF THE SELECTED EVENTS ARE TRUE. |
| 10 | NOR | ALL OF THE SELECTED EVENTS ARE FALSE. |
| 11 | NAND | ANY ONE OF THE SELECTED EVENTS IS FALSE. |

The count-control register 250 is coupled to the programmable logic circuitry 300 by signal lines 252. In the preferred embodiment, the count-control register 250 has eight bits. The contents of the count-control register 250 determine whether the performance counter 202 is enabled for counting. When the performance counter 202 is enabled, the count-control register 250 determines what conditions increment the performance counter 202 and what operations are performed, should there be any, when the counter 202 overflows.

A user of the computer system 100 can dynamically configure the count-control register 250 while the system 100 is operating. The processor 102 can access the count-control register 250 for reading and writing by signal lines 254. The state of the eight bits determines which function of selected event signals is used to increment the performance counter 202. For example, if bits 3:2 of the count-control register 250 are set to $01_2$, then counting is enabled, and the count-result register 210 increments by the amount determined by bits 7:4 when the conditions, as set forth by bits 1:0, are met. TABLE C shows an exemplary correspondence between the eight bits and selected functions. TABLE D shows an exemplary correspondence between bits 7:4 and the amount that may be added to the count-result register 210.

TABLE C

| BITS | FUNCTION | FUNCTION DESCRIPTION |
|---|---|---|
| 1:0 | INC-FUNCTION | SELECTS THE CRITERIA FOR INCREMENTING THE PERFORMANCE COUNTER. |
| 00 | OR | INCREMENT IF ANY OF THE SELECTED EVENTS ARE TRUE. |
| 01 | AND | INCREMENT IF ALL OF THE SELECTED EVENTS ARE TRUE. |
| 10 | NOR | INCREMENT IF ALL OF THE SELECTED EVENTS ARE FALSE. |
| 11 | NAND | INCREMENT IF ANY OF THE SELECTED EVENTS ARE FALSE. |
| 3:2 | INC-ENABLE | SELECTS WHETHER AND HOW TO ENABLE THE PERFORMANCE COUNTER. |
| 00 | NONE | DISABLE COUNTING. |
| 01 | COUNT | ENABLE COUNTING BASED UPON BITS INC-FUNCTION. |
| 10 | CHECK | ENABLE COUNTING AND INTERRUPT ON COUNTER OVERFLOW. |
| 11 | HALT | ENABLE COUNTING, AND INTERRUPT AND HALT ON PERFORMANCE COUNTER OVERFLOW. |
| 7:4 | INC-VALUE | SPECIFIES THE NUMBER TO ADD TO THE PERFORMANCE COUNTER IF INCREMENTING. |

TABLE D

| BITS (7:4) | INC-VALUE | FIELD DESCRIPTION |
|---|---|---|
| 0 | SINGLE | INCREMENT BY ONE |
| 1–7 | VARIOUS EVENTS | INCREMENT BY 0 TO 8 |

TABLE D-continued

| BITS (7:4) | INC-VALUE | FIELD DESCRIPTION |
|---|---|---|
| 8 | EMPTY | # OF MEMORY CONTROLLERS WITH EMPTY PIXEL QUEUES (0 TO 8) |
| 9 | PARTIAL | # OF MEMORY CONTROLLERS WITH NON-EMPTY PIXEL QUEUES (0 TO 8) |
| 10 | FULL | # OF MEMORY CONTROLLERS WITH FULL TOP PIXEL QUEUE (0 TO 8) |
| 11 | INACTIVE | # OF MEMORY CONTROLLERS COMPLETELY IDLE (0 TO 8) |
| 12 | OVERHEAD | # OF MEMORY CONTROLLERS EXECUTING NON-DATA CYCLE (0 TO 8) |
| 13 | ACTIVE | # OF MEM-CONTROLLERS READING OR WRITING DATA (0 TO 8) |
| 14 | READ | # OF MEMORY CONTROLLERS READING DATA (0 TO 8) |
| 15 | WRITE | # OF MEMORY CONTROLLERS WRITING DATA (0 TO 8) |

The event signals 112 are provided to the programmable logic circuitry 300. Also, the programmable logic circuitry 300 receives the bit values of the count-event register 240 by signal lines 242. The signals 242 correspond to the bits 63:0 of the count-event register 240. Signal lines 252 provide the bit values of the count-control register 250 to the programmable logic circuitry 300. Configuring the programmable logic circuitry 300 involves programming the count-event register 240 and the count-control register 250.

The programmable logic circuitry 300 is coupled to the adder 220 by signal line 222. As described below in FIG. 6, the programmable logic circuitry 300 of the preferred embodiment can produce an INCR-VALUE 222 in the range of 0 to 8 in a single clock cycle of the system 100. Previous implementations of performance counters can increment only by one during a single clock cycle. The principles of the invention can extend to greater or lesser ranges of values for INCR-VALUE 222.

Figure 3:
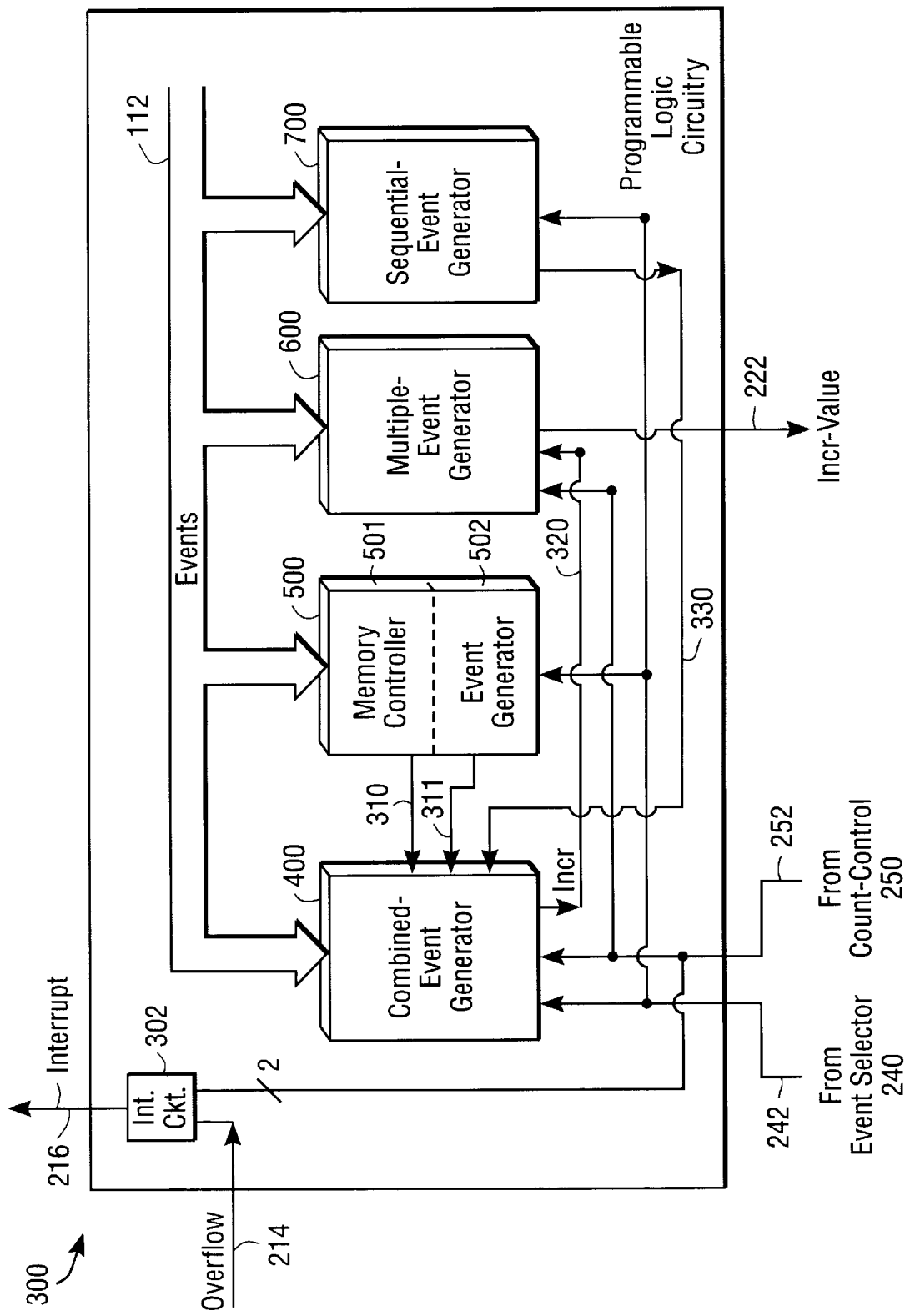
FIG. 3 is a block diagram of the exemplary programmable logic circuitry of FIG. 2 including a combined-event generator, a memory controller event generator, a multiple-event generator and a sequential-event generator.

FIG. 3 shows the exemplary programmable logic circuitry 300 of FIG. 2 including interrupt circuitry 302, a combined-event generator 400, a memory controller event generator 500, a multiple-event generator 600 and a sequential-event generator 700. Event signals 112 pass to each of the event generators 400, 500, 600, 700. Event generators 400 and 600 are each coupled to the count-control register 250 by signal lines 252, and event generators 400, 500 and 700 are each coupled to the count-event register 240 by signal lines 242.

From the count-result register 210, the interrupt circuitry 302 receives the overflow signal 214. The interrupt circuitry 302 also receives bits 3:2 of the count-control register 250. According to TABLE C, the interrupt circuitry 302 issues an interrupt 144 when the count-result register 210 overflows if the bits 3:2 are either 102 or 112.

The memory controller event generator 500 includes, for example, two group event generators 501, 502. The group event generator 501 corresponds to those memory controllers 104 which are configured into group 0, and the group event generator 502 corresponds to the other memory controllers 104 which are configured into group 1. Each group event generator 501, 502 is coupled to the combined-event generator 400: group event generator 501 by signal lines 310; and group event generator 502 by signal lines 311.

The sequential-event generator 700 is coupled to the combined-event generator 400 by signal line 330. The combined-event generator 400 can provide an INCR signal to the multiple-event generator 600 by signal line 320. The multiple-event generator 600 issues the INCR-VALUE signal 222, which is fed to the adder 220 of FIG. 2.

The operation specific to each event generator 400, 500, 600, and 700 is described below in connection with FIGS. 4–7. In general, each event generator 400, 500, 600, and 700 enhances the functionality of the performance counter unit 200. The combined-event generator 400 enables the counting of programmable combinations of events; the memory controller event generator 500, the counting of related events in a single execution of an application program; the multiple-event generator 600, the counting of multiple occurrences of an event in a single system clock cycle; and the sequential-event generator 700, the counting of occurrences of sequentially-related events.

Figure 4:
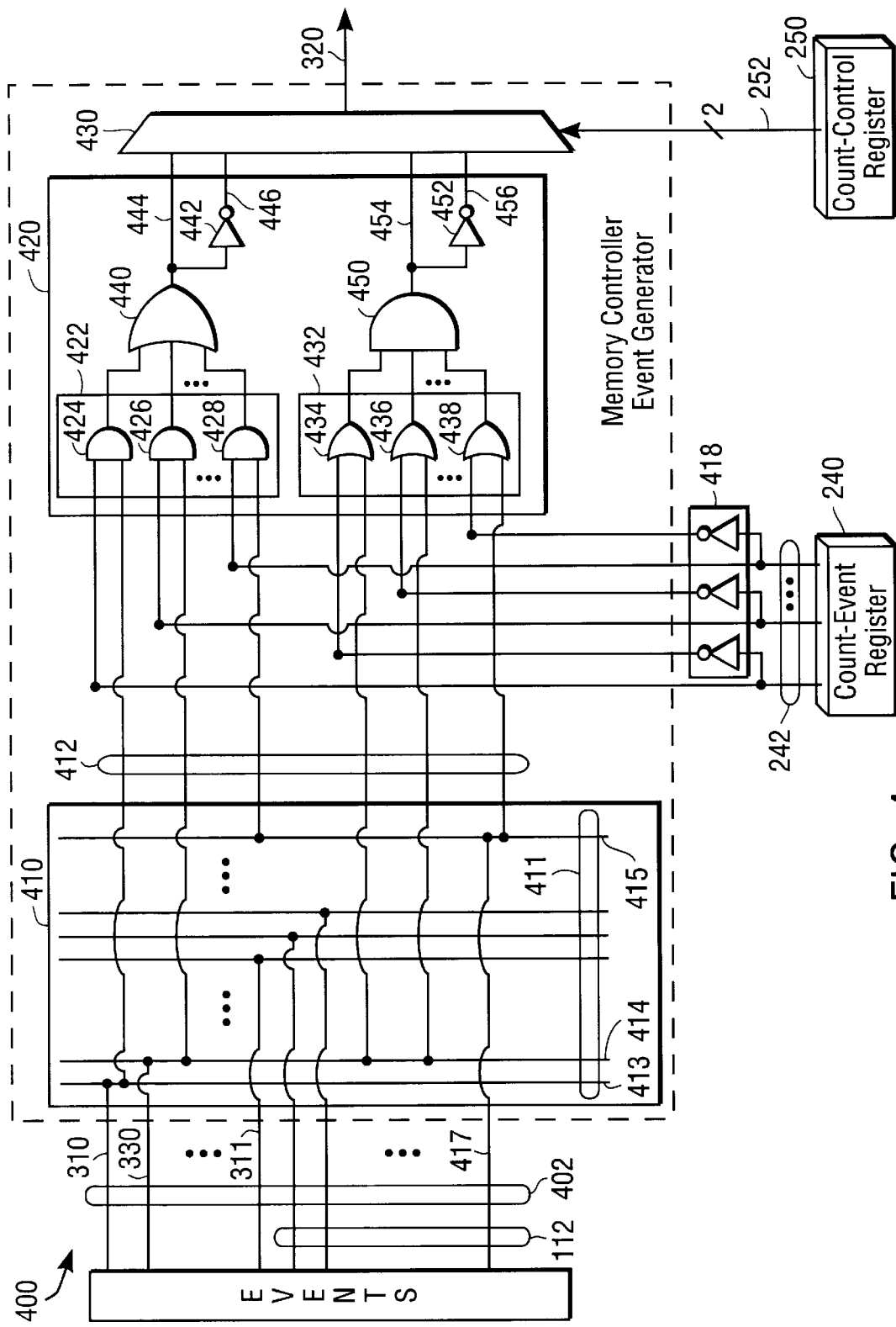
FIG. 4 is a block diagram of the exemplary combined event generator of FIG. 3.

FIG. 4 shows the exemplary combined-event generator 400 of FIG. 3 including an array of bus lines 410, logic circuitry 420 and a multiplexer 430. Event signals 112, 310, 311 and 330, collectively referred to as events signals 402, are provided to the bus line array 410.

The array of bus lines 410 includes input lines 411 and output lines 412. Each incoming event signal 402 is electrically connected to a unique one of the input lines 411. For illustration purposes, three of the input lines 413, 414, 415 are each shown to be electrically connected to two output lines 412. The event signals 310, 330 and 417, corresponding respectively to the input lines 413, 414, 415, are passed to the logic circuitry 420.

The logic 420 circuitry includes an exemplary arrangement of AND gates 422, 450, OR gates 432, 440, and inverters 442, 452 that are arranged to produce logical signals 444, 446, 454, 456 from the event signals 402 that are provided to the logic circuitry 420 through the array 410. Other arrangements of various logic gates may be used to achieve these and other logical signals. Event select signals 242 and their complements, which are produced by inverters 418, are provided to the logic circuitry 420. Each of the event select signals 242 corresponds to one of the events 402, and indicates whether that corresponding event is or is not selected.

The AND gates 422 include an AND gate 424, 426, 428 for each event 402. Each AND gate 424, 426, 428 is associated with one of the events 402, and includes two inputs: a first input receives the associated event signal 402 via an output line 412; and a second input receives the event select signal 242 corresponding to that associated event signal 402.

The output of each AND gate 424, 426, 428 is coupled to an input of the OR gate 440. Each AND gate 424, 426, 428 evaluates true ("1") when the associated event occurs (i.e., the associated event signal line 402 is true) and the event select signal 242 corresponding to that event is true (i.e. the event is selected in the count-event register 240). The logical signal 444 produced by the AND gates 422 and the OR gate 440 evaluates true when any of the selected events occurs. The logical signal 444 corresponds to the OR function listed in TABLE C.

The inverter 442 complements the logical signal 444 to produce logical signal 446, which evaluates true if all of the selected events do not occur. The logical signals 446 corresponds to the NOR function listed in TABLE C.

The OR gates 432 include an OR gate 434, 436, 438 for each event 402. Each OR gate 434, 436, 438 is associated with one of the events 402, and includes two inputs: a first input receives the associated event signal 402 via an output line 412; and a second input receives the complement of the event select signal 242 corresponding to that associated event signal 402.

The output of each OR gate 434, 436, 438 is coupled to an input of the AND gate 450. Each OR gate 434, 436, 438 evaluates true ("1") when either the associated event occurs (i.e., the associated event signal line 402 is high) or the event select signal 242 corresponding to that event is false (i.e., the event is not selected).

The logical signal 454 produced by the OR gates 432 and the AND gate 450 evaluates true when all of the selected events occur. The logical signal 454 corresponds to the AND function listed in TABLE C. The inverter 452 complements the logical signal 454 to produce logical signal 456, which evaluates true if any of the selected events do not occur. The logical signal 456 corresponds to the NAND function listed in TABLE C.

The multiplexer 430 is coupled to receive the logical signals 444, 446, 454, 456 from logic circuitry 420. The multiplexer 430 is also coupled to receive an input signal 252 from the count-control register 250 for determining which of the four logical signals 444, 446, 454, 456 to select.

Both the count-event register 240 and the count-control register 250 can be dynamically programmed throughout an execution of an application program. Accordingly, the dynamic programming of the count-event register 240 configures the AND gates 422 and OR gates 432 to select and deselect event signals 402 throughout the operation of the program. For example, when only the corresponding bit of the count-event register 240 is set high to select event signal 310, then the outputs of the AND gate 424 and the OR gate 434 follow the state of the event signal 310; i.e., when the event signal 310 is high, then the outputs of AND gate 424 and OR gate 434 are high, when the event signal 310 is low, then the outputs of the AND gate 424 and the OR gate 434 are low. If the corresponding bit is set low so as not to select event signal 310, then the output of the AND gate 424 and the output of the OR gate 434 are not a function of the state of the event signal 310.

By programming the count-control register 250, the multiplexer 430 can be dynamically configured and re-configured to change the selection of the logical signals 444, 446, 454, 456. This dynamic selection of event signals and logical signals enables the system user to tailor the performance counter unit 200 to evaluate performance problems which are not discovered until after the system 100 has been operating.

Operation of the computer system 100 is now described with respect to FIGS. 2–4. For illustration purposes only, at the run time of an application program, the contents of the count-event register 240 are written so as to select event signals 310, 330 and 417. Note that if no events are selected by the count-event register 240, then the logical signals 446 and 454 evaluate true during every clock cycle. Thus, either logical signal 446 or 454 can operate as an ALWAYS count function, to send a signal 320 to increment the performance counter 202 on every clock cycle.

During each system clock cycle, the four logical signals 444, 446, 454, 456 are evaluated for event signals 310, 330, and 417. The logical signal 444 evaluates true when any of the selected events 310, 330, and 417 occurs; logical signal 446 evaluates true if all of the selected events 310, 330 and 417 do not occur; logical signal 454 evaluates true when all of the selected events 310, 330, and 417 occur; and logical signal 456 evaluates true if any of the selected events 310, 330, 417 do not occur.

Also at run time, the processor 102 writes to the count-control register 250 in order to control the operation of counting events. Writing $01_2$ to bits 3:2 of the count-control register 250 enables counting. The contents of bits 1:0 of the count-control register 250 determine which of the logical signals 444, 446, 454, 456 is selected for counting (see TABLE C above). Bits 1:0 are sent to the multiplexer 430 via signal lines 252 to make the selection.

For each clock cycle in which the selected logical signal evaluates true, the multiplexer 430 asserts a true signal ("1") on signal line 320, prompting the performance counter 202 to be incremented.

Figure 5:
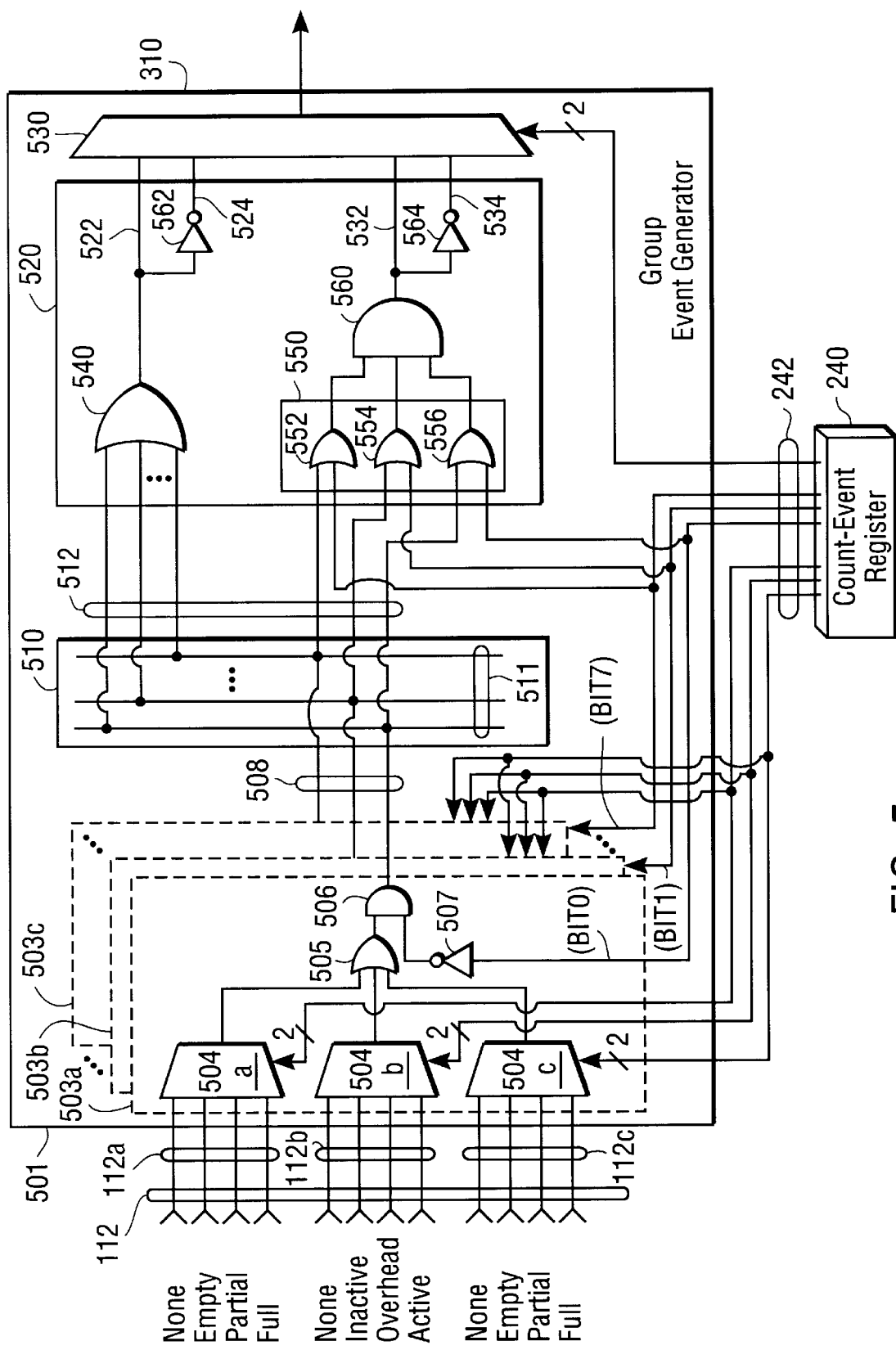
FIG. 5 is a block diagram of an exemplary group event generator of the memory controller event generator of FIG. 3.

FIG. 5 shows the exemplary group event generator 501 of the memory controller event generator 500 of FIG. 3. As described above, the memory controllers 104 are organized, for example, into either group 0 or group 1. Each memory controller 104 of a particular group is monitored alike. Event signals that are selected for monitoring for any one memory controller 104 in a particular group are also selected for all other memory controllers 104 in that particular group.

The group event generator 501 combines the selected events of memory controllers 104 that are in group 0, and the group event generator 502 combines the selected events of memory controllers 104 that are in group 1. Except where noted, the group event generator 501 is representative of each group event generator 501, 502 of the memory controller event generator 500.

Bits 7:0 of the count-event register 240 go to each group event generator 501, 502. The memory controllers 104 can be assigned to either group 0 or group 1 by programming the bits 7:0 (see TABLE A). The bits 7:0 may be programmed at any point during an the execution of an application program. Thus, the grouping of memory controllers 104 is dynamically configurable.

The group event generator 501 includes event selectors 503-A, 503-B, 503-C, an array of bus lines 510, logic circuitry 520 and an output multiplexer 530. There is an event selector 503-A, 503-B, 503-C for each one of the memory controllers 104 in the computer system 100. For example, in FIG. 5, event selector 503-A corresponds to memory controller #0, event selector 503-B to memory controller #1, and event selector 503-C to memory controller #7.

Each event selector 503-A, 503-B, 503-C includes input multiplexers 504-A, 504-B, 504-C, an OR gate 505, an AND gate 506 and an inverter 507. (For the group event generator 502, there is no inverter 507.) Each memory controller 104 provides event signals 112 to the input multiplexers 504-A, 504-B, 504-C of the corresponding event selector 503-A, 503-B, 503-C. The input multiplexers 504-A, 504-B, 504-C each receive one subset 112A, 112B, 112C of the event signals 112. The multiplexer 504-A receives the subset 112A, multiplexer 504-B receives subset 112B, and multiplexer 504-C receives subset 112C.

Each subset of event signals 112A, 112B, 112C corresponds to one type of memory controller event described in TABLE B: subset 112A includes the MEMORY-QUEUE events NONE, EMPTY, PARTIAL, and FULL; subset 112B, the MEMORY-STATE events NONE, INACTIVE, OVERHEAD and ACTIVE; and subset 112C, the READ QUEUE events NONE, EMPTY, PARTIAL, and FULL.

Each multiplexer 504-A, 504-B, 504-C receives event select signals 242 from the count-event register 240. One event is selected from each subset 112A, 112B, 112C of event signals 112. The group event generator 501 receives bits 15:8 of the count-event register 240 to control the event selection of group 0 memory controllers (see TABLE A). Bits 23:16 of the count-event register 240 go to the group event generator 502 to control the event selection of group 1 memory controllers.

Each multiplexer 504-A, 504-B, 504-C receives two event select signals 242. The multiplexer 504-A receives bits 9:8; multiplexer 504-B, bits 11:10; and multiplexer 504-C, bits 13:12. The selected events are interpreted according to TABLE B (bits 13:8 of TABLE A map to bits 5:0 of TABLE B). For example, when the event select signals 242 corresponding to bits 13:8 of TABLE A are $011011_2$, then bits 5:0 of TABLE B indicates that the FULL MEMORY QUEUE event is selected by multiplexer 504-A, the OVERHEAD MEMORY-STATE event by multiplexer 504-B, and the EMPTY READ-QUEUE event by multiplexer 504-C. If no memory controller events are wanted, then bits 13:8 of TABLE A are set to $000000_2$ to select the NONE events at each multiplexer 504-A, 504-B, 504-C.

The event selector 503-A of the group event generator 501 selects the same memory controller events as event selector 503-B and as event selector 503-C. Using the previous example, if the event selector 503-A selects the FULL MEMORY QUEUE event, the OVERHEAD MEMORY-STATE event, and the EMPTY READ-QUEUE event, then each other event selector 503-B, 503-C also selects these events. More specifically, the multiplexer 504-A of each event selector 503-A, 503-B, 503-C each select the FULL MEMORY QUEUE event, each multiplexer 504-B selects the OVERHEAD MEMORY STATE event, and each multiplexer 504-C selects the EMPTY READ-QUEUE event. Accordingly, those memory controllers 104 configured into a particular group are monitored concurrently for the occurrence of certain events.

For event selector 503-A, the outputs of the multiplexers 504-A, 504-B, 504-C represent the selected events of a particular memory controller. These outputs pass to the OR-gate 505. The occurrence of any selected event produces a high signal at the output of the OR-gate 505. The OR-gate feeds this output into an input of the AND gate 506.

The inverter 507 provides a second input to the AND gate 506. One of the bits 7:0 of the count-event register 240 is fed into the inverter 507 of each event selector 503-A, 503-B, 503-C. For example, bit 0 is supplied to event selector 503-A, bit 1 to event selector 503-B, and so forth. Bit 0 indicates whether the memory controller #0, which corresponds to the event selector 503-A, is in group 0 or in group 1 (see TABLE A). When the memory controller #0 is in group 0, a "0" is input to the inverter 507, and the inverter 507 provides a "1" to the AND gate 506. Conversely, the inverter 507 disables the AND gate 506 by supplying a "0" when the memory controller #0 is in group 1 (i.e., a "1" is sent to the inverter 507 from the count-event register 240). The output 508 of the AND gate 506 of each event selector 503-A, 503-B, 503-C passes to the array of bus lines 510.

For the group event generator 502, which has no inverters 507, the bits 7:0 from the count-event register 240 pass directly to the AND gates 506. Accordingly, each AND gate 506 is disabled when the supplied bit indicates the corresponding memory controller is in group 0, and enabled when that memory controller is in group 1.

The array of bus lines 510 includes input lines 511 and output lines 512. There is one input line 511 for each event selector 503-A, 503-B, 503-C. The outputs 508 of the event selectors 503-A, 503-B, 503-C are each electrically connected to a unique one of the input lines 511. Each input line 511 is connected to two output lines 512. The output lines 512 feed into the logic circuitry 520. Accordingly, the outputs 508 of the event selectors 503-A, 503-B, 503-C pass to the logic circuitry 520.

The logic circuitry 520 includes an exemplary arrangement of OR gates 540, 550, an AND gate 560, and inverters 562, 564 arranged to produce logical signals 522, 524, 532, 534 from those event signals that are provided to the logic circuitry 520 via the array 510. Other arrangements of logic gates may be used to produce these 522, 524, 532, 534 and various other logical signals.

The output 508 of each event selector 503-A, 503-B, 503-C is coupled through the array of bus lines 510 to an input of the OR gate 540. The logical signal 522 produced by the OR gate 540 evaluates true ("1") when any of the outputs 508 evaluates true. Logical signal 522 corresponds to the OR function of the event type MEMORY-FUNCTION listed in TABLE B.

Inverter 562 complements logical signal 522 to produce logical signal 524, which evaluates true when none of the outputs 508 occurs. The logical signal 524 corresponds to the NOR function of the event type MEMORY-FUNCTION listed in TABLE B.

The OR gates 550 include an OR gate 552, 554, 556 for each event selector 503-A, 503-B, 503-C. Each OR gate 552, 554, 556 is associated with one of the event selectors 503-A, 503-B, 503-C, and includes two inputs: a first input receives the output 508 of the associated event selector 503-A, 503-B, 503-C; and a second input receives one of the bits 7:0 from the count-event register 240. The particular bit that is sent to the second input of each OR gate 552, 554, 556 is the same bit that is sent to the inverter 507 of the event selector 503-A, 503-B, 503-C associated with that OR gate 552, 554, 556.

The output of each OR gate 552, 554, 556 is coupled to an input of the AND gate 560. Each OR gate 552, 554, 556 evaluates true ("1") when either the associated output 508 occurs, i.e., an event selected by the associated event selector 503-A, 503-B, 503-C is high, or the memory controller 104 associated with the bit sent to that OR gate 552, 554, 556 is high, i.e., that memory controller 104 is not in group 0.

The AND gate 560 evaluates true when all the selected outputs 508 are true. The output of the AND gate 560 produces the logical signal 532, which corresponds to the AND function listed in TABLE B.

The inverter 564 complements the logical signal 532 to produce logical signal 534. The logical signal 534 corresponds to the NAND function listed in TABLE B, and evaluates true if any of the selected events corresponding to outputs 508 do not occur.

The multiplexer 530 is coupled to receive the logical signals 522, 524, 532, 534 from logic circuitry 520, and to receive event select signals 242 from the count-event register 240 for determining which of the four logical signals 522, 524, 532, 534 to select. The two event select signals 242 corresponding to the bits 15:14 of TABLE A (bits 23:22 for the group event generator 502) control the selection. (See also bits 7:6 of TABLE B.) The selected logical signal is output 310 to the combined-event generator 400.

The output 310 of the group event generator 501 is a singular event that can be counted like any other event signal 112. So too is the output 311 of the group event generator 502.

The count-event register 240 can be programmed throughout an execution of an application program. Accordingly, each input multiplexer 504-A, 504-B, 504-C can be dynamically configured to select a memory controller event signal, or to select no event signal at all (i.e., NONE—see TABLE B). When the count-event register 240 is programmed to select the NONE event signal for all three input multiplexers 504-A, 504-B, 504-C, all input signals to the OR gate 505 are low, and thus the AND gate 506 outputs a low signal. Accordingly, each event selector 503-A, 503-B, 503-C produces a low output 508.

The ability to dynamically program the bits 15:14 of the count-event register 240 permits a user to configure and re-configure the multiplexer 530 to change the selection of the logical signals 522, 524, 532, 534 at any point in the execution of a program.

An exemplary operation of the memory controller event generator 500 is described with respect to the following practical situation: the system user may be interested in determining how often the queues of a specific memory controller are full while the queues of another memory controller is empty. By setting the appropriate bits of the count-event register 240, the specific memory controller is assigned to group 0, and the FULL event (under MEMORY-QUEUE) is selected as the event to be monitored for group 0.

The multiplexer 530 of the group event generator 501 can be configured to select either the AND logical signal 532 or the OR logical signal 522, because only the specific memory controller is in group 0. The resulting output 310 is passed to the combined-event generator 400. The output 310 will be high when the specific memory controller generates a FULL event signal.

The other memory controllers are assigned to group 1. The bit in the count-event register 240 corresponding to the EMPTY event is set. The multiplexer 530 of the group event generator 502 is configured to select the OR logical signal 522. The output 311 of the group event generator 502 is also passed to the combined-event generator 400. The output 311 will be high when any of the seven memory controllers in group 1 generates an EMPTY event signal.

The multiplexer 430 of the combined-event generator 400 is configured to select the AND function 454. The combined-event generator 400 then produces a high output 320 when the output 310 from the group event generator 501 and the output from the group event generator 502 are true concurrently. Each occurrence of a high output 320 can be added to the counter 202. Accordingly, the count in the count-result register 210 represents how often the queues of the specific memory controller are full while a queue of another memory controller is empty.

Figure 6:
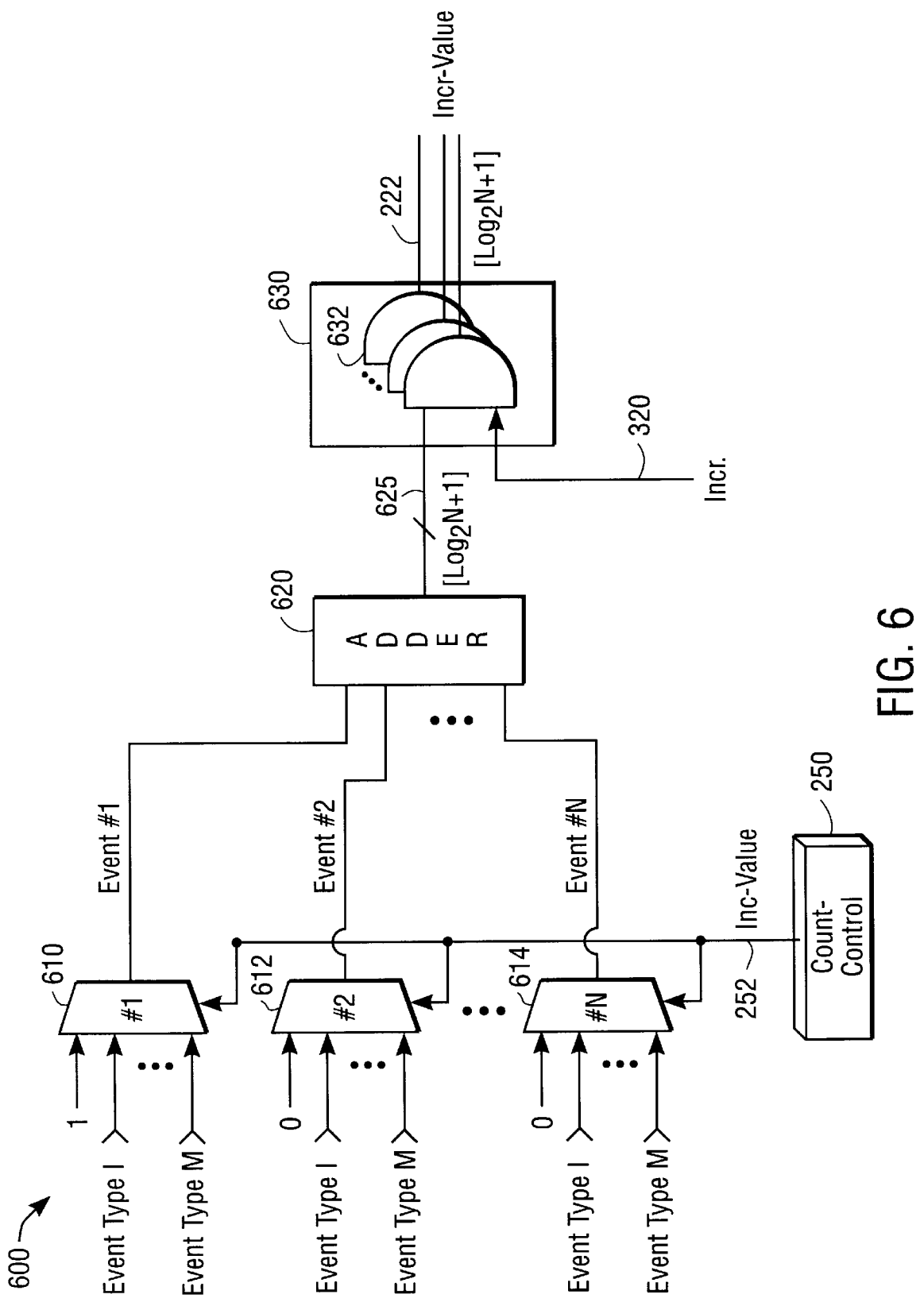
FIG. 6 is a block diagram of the exemplary multiple event generator of FIG. 3.

FIG. 6 shows the exemplary multiple-event generator 600 of FIG. 3 including N multiplexers 610–614, an N-input adder 620 and an AND logic 630. The multiplexers 610–614 correspond to each component in the computer system 100 that can produce the same event signals during a single clock cycle. In FIG. 6 there are M types of event signals that can be produced by each of the N components in the system 100. The eight memory controllers 104 of the preferred embodiment are examples of such components.

Each multiplexer 610–614 includes an input for each event that the corresponding component can produce, and an additional input with a default value. The default value for the additional input to multiplexer 610 is one. The additional inputs to the other multiplexers 612, 614 have a default value of zero. The default value is selected when counting multiple occurrences of an event is disabled. The count-control register 250 provides a signal 252 to each multiplexer 610-614 that enables multiple counting by selecting an event type to be counted.

In the preferred embodiment, bits 7:4 of the count-control register 250, called INC-VALUE in TABLE C, determine which event type is monitored for multiple occurrences in a single cycle. Accordingly, any of 15 different event types (i.e., M=15) can be chosen for monitoring. When INC-VALUE is $0000_2$, there is no selected event type, and the default value inputs to each multiplexer 610–614 are used. When INC-VALUE is $0001_2$, then EVENT type #1 is selected for multiple count monitoring. TABLE D provides a correspondence between the INC-VALUE and descriptions of the event type that is monitored for multiple counting.

Each multiplexer 610–614 produces a single-bit output. These outputs pass to the N-input adder 620. The N-input adder 620 produces a ceiling ($log_2N+1$) bit output 625, which passes to the AND logic 630. The output 625 represents the number of multiplexers 610–614 that have indicated the selected event.

The AND logic 630 includes ceiling($log_2N+1$) AND gates 632. Each AND gate 632 receives one of the bits of adder output 625, and the INCR signal 320, which is produced by the combined-event generator 400 of FIG. 4. From the INCR signal 320 and the adder output 625, the AND logic 630 produces the INCR-VALUE signal 222 that passes to the performance counter 202 of FIG. 2. The INCR-VALUE signal 222 represents the number of multiplexers 610–614 that have indicated the selected event during a single clock cycle.

An exemplary operation of the multiple-event generator 600 is shown using the following exemplary practical situation involving Digital Equipment Corporation's 21164 microprocessor. This situation demonstrates how the multiple-event generator 600 can count multiple occurrences of a particular event in a single system clock cycle. In this example, the particular event is the issuing of an instruction. Digital Equipment Corporation's 21164 microprocessor uses parallelism, and can issue from 0 to 4 instructions during any clock cycle.

In order to count instructions issued by a microprocessor like the 21164 during the execution of an application, prior performance counter implementations would have to devise five types of event signals, one for each number of instructions that can be issued during a clock cycle. This approach is cumbersome, and requires several executions of an application program, in which each execution monitors a different event signal type. Then a total issued instruction count is calculated from the results of the individual executions. This total count may not be accurate because some application programs run at real time, and two successive runs of such programs may not produce repeatable results. I.e., a first run may produce more events representing four issued instructions in one clock cycle than a second run, but if the four issued instruction event is not counted until the second run, then an inaccurate total count could be obtained.

The multiple-event generator 600 can obtain the total count of issued instructions with one counter in one execution of the application program. Each component that can issue an instruction within a clock cycle sends an event signal, called for example ISSUED_INSTRUCTION, to one of the multiplexers 610–614. If there are four such components, for example, then there are four corresponding multiplexers. Each multiplexer receives the ISSUED_INSTRUCTION event signal on the same input as every other multiplexer. During each clock cycle, each component that asserts the ISSUED_INSTRUCTION event signal sends a "1" to that input of the corresponding multiplexer.

Also, the system 100 user programs the bits 7:4, INC-VALUE, of the count-control register 250 to select that input receiving the ISSUED_INSTRUCTION. This selection causes the ISSUED_INSTRUCTION event signal at each multiplexer 610–614 to pass to the adder 620.

The adder 620 adds the number of asserted ISSUED_INSTRUCTION event signals (i.e., the "1"s), and produces a binary output 625 representing the total. This total is the number of components that have issued an instruction during the current clock cycle. The binary output 625 is ANDed with the INCR 320 signal from the combined-event generator 400 to produce the INCR-VALUE 222. The combined-event generator 400 can produce a high INCR 320 signal on every clock cycle when configured in the ALWAYS count function described above in FIG. 4. This assures that upon each clock cycle, the AND logic 630 passes the binary output 625 of the adder 620 as INCR-VALUE 222 to the performance counter 202. The INCR-VALUE 222 is then added to the count-result register 210 of the performance counter 202.

Figure 7:
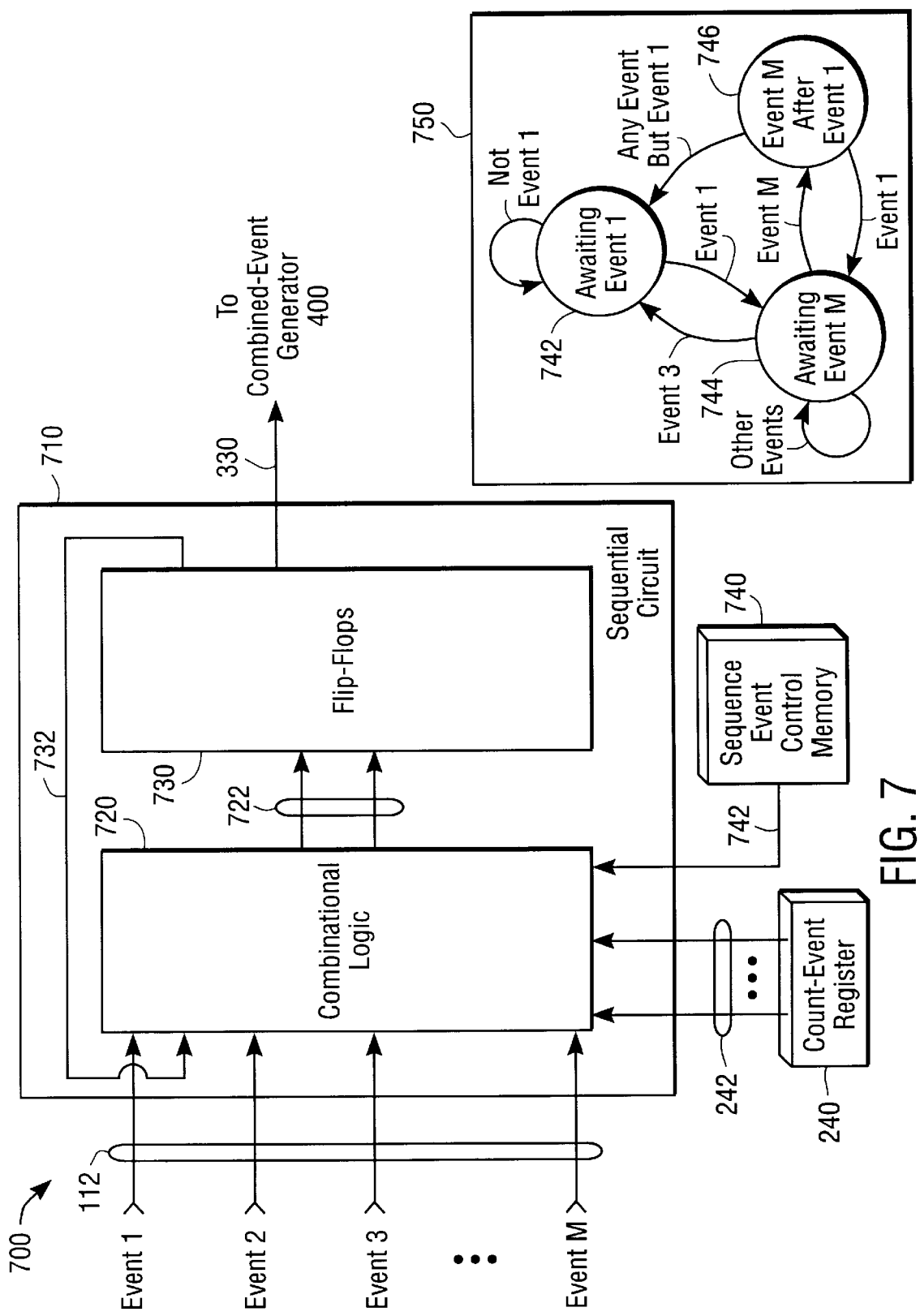
FIG. 7 is a block diagram of the exemplary sequential event generator of FIG. 3.

FIG. 7 shows the exemplary sequential-event generator 700 of FIG. 3 including a sequential circuit 710 and sequence event control memory 740. The sequential circuit 710 receives each event signal 112. In an alternative embodiment, the sequential circuit 710 can also receive event signals 310, 311 that are produced by the group event generators 501, 502 of the memory controller event generator 500. Using the sequential-event generator 700, a system user can create sequential events; i.e., the user can count occurrences of specified event sequences, such as when one event type occurs before another event type without any intervening occurrences of a third event type.

The sequential circuit 710 includes combinational logic 720 and clocked set/reset flip flops 730. It is well known in the art that the arrangement of the event signals 112, the combinational logic 720 and flip flops 730 can produce various states in which the sequential circuit 710 operates. The outputs 722 of the combinational logic 720 go to inputs of the flip flops 730, and the present state 732 of the flip flops 730 is fed back to the inputs of the combinational logic 720. The sequence event control memory 740 specifies the operational behavior of the sequential circuit 710. State diagram 750 provides an example of the operational behavior that can be specified by the sequence event control memory 740.

The count-event register 240 provides event select signals 242 to the combinational logic 720. These event select signals 242 determine which event signals 112 are to be included in generating a sequential event. The user can program the count-event register 240 throughout the operation of an application program. Thus, the selection of event signals 112 can be dynamically determined.

The operation of the sequential-event generator 700 is described with respect to the exemplary state diagram 750 and the following example: counting how often EVENT 1 occurs before EVENT M without an intervening occurrence of EVENT 3.

The logic 720 and flip flops 730 are interconnected to produce three states: a first state 742 called AWAITING EVENT 1; a second state 744, RECEIVED EVENT 1/AWAITING EVENT M; and a third state 746, RECEIVED EVENT M AFTER EVENT 1. The operation of the sequential circuit 710 does not transition from the first state 742 to the second state 744 until an EVENT 1 signal occurs. The circuit 710 returns to operating in state 742, however, if while in state 744 an EVENT 3 signal is received by the combinational logic 720 before an EVENT M signal. But if an EVENT M signal is subsequently received without an intervening EVENT 3 signal, the circuit 710 passes to state 746. Then the sequential circuit 710 asserts a high ("1") output 330 because the desired sequence of events, as set forth by the sequence event control memory 740, has occurred. The signal 330 passes to the combined-event generator 400 of FIG. 3, through which the occurrence of this sequence of events can be counted as described in FIG. 4.

If during the next clock cycle EVENT 1 occurs, then the circuit 710 transitions to state 744; otherwise the circuit 710 passes to state 742 to await another EVENT 1 signal.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

What is claimed is:

1. An apparatus for counting event signals generated by a computer system, comprising:

an event signal selector circuit that selects a subset of at least two event signals from a set of event signals generated by the computer system, the at least two event signals being generated concurrently;

an event signal combiner circuit including:

a logic circuit that, in a single clock cycle, generates combined event signals based on the at least two event signals of the subset in accordance with predefined logic functions, and a multiplexor that receives the combined event signals from the logic circuit, and outputs one of the combined event signals as a new event signal in accordance with a selected one of the predefined logic functions; and a counter that is incremented in response to the new event signal.

2. The apparatus of claim 1 wherein the event signal selector circuit is dynamically configurable while the computer system is operating for selecting a new subset of event signals from the set of event signals generated by the computer system.

3. The apparatus of claim 1 wherein the selected subset of event signals includes a first event signal and a second event signal, and the logic circuit generates, in accordance with at least one of the predefined logic functions, at least one of the combined event signals when the computer system generates either the first event signal or the second event signal during the single clock cycle.

4. The apparatus of claim 1 wherein the selected subset of event signals includes a first event signal and a second event signal, and the logic circuit generates, in accordance with at least one of the predefined logic functions, at least one of the combined event signals when neither the first event signal nor the second event signal is generated by the computer system during the single clock cycle.

5. The apparatus of claim 1 wherein the selected subset of event signals includes a first event signal and a second event signal, and the logic circuit generates, in accordance with at least one of the predefined logic functions, at least one of the combined signals when the computer system generates the first event signal and the second event signal during the single clock cycle.

6. The apparatus of claim 1 wherein the selected subset of event signals includes a first event signal and a second event signal, and the logic circuit generates, in accordance with at least one of the predefined logic functions, at least one of the combined signals when either the first event signal or the second event signal is not generated by the computer system during the single clock cycle.

7. The apparatus of claim 1 wherein the selected subset of event signals includes a first event signal and a second event signal, the first event signal and the second event signal occurring concurrently, and each indicating an occurrence of a particular event; and wherein the logic circuit generates at least one combined signal based on the first event signal and the second event signal so that each concurrent occurrence of the particular event is counted in one counter during a single clock cycle.

8. The apparatus of claim 1 wherein the logic circuit generates a plurality of combined event signals from the selected subset of event signals; and further comprising:

a register, coupled to the multiplexor, for selecting which of the combined event signals to count.

9. The apparatus of claim 8 wherein the register is dynamically configurable while the computer system is operating for selecting a different one of the combined event signals to count.

10. The apparatus of claim 1 wherein the logic circuit generates a plurality of combined event signals including:

a first combined event signal that is generated when any of the event signals of the selected subset is true in accordance with a first predefined logic function;

a second combined event signal that is generated when all of the event signals of the selected subset are true in accordance with a second predefined logic function;

a third combined event signal that is generated when any of the event signals of the selected subset is false in accordance with a third predefined logic function; and a fourth combined event signal that is generated when all of the event signals of the selected subset are false in accordance with a fourth predefined logic function.

11. An apparatus for counting event signals generated by a computer system, comprising: an event signal selector circuit that selects a subset of at least two event signals from a set of event signals generated by the computer system, wherein the selected subset of event signals includes a first event signal and a second event signal that is distinct from the first event signal, the first event signal and the second event signal occurring in different clock cycles;

an event signal combiner circuit that combines the selected subset of event signals to generate a new event signal, the event signal combiner circuit including a sequential-event generator that generates the new event signal when the computer system generates the second event signal after generating the first event signal; and a counter that is incremented in response to the new event signal.

12. The apparatus of claim 11 wherein the selected subset of event signals includes a third event signal, and the sequential-event generator generates the new event signal unless the computer system generates the third event signal during a clock cycle after generating the first event signal and before generating the second event signal.

13. An apparatus for counting event signals generated by a computer system, comprising:

a plurality of performance counter units each receiving a same set of event signals generated by the computer system as each other performance counter unit, each performance counter unit including:

an event signal selector circuit that selects a subset of at least two event signals from the set of event signals generated by the computer system, the at least two event signals being generated concurrently;

an event signal combiner circuit including:

a logic circuit that, in a single clock cycle, generates combined event signals based on the at least two event signals of the subset in accordance with predefined logic functions, and a multiplexor that receives the combined event signals from the logic circuit, and outputs one of the combined event signals as a new event signal in accordance with a selected one of the predefined logic functions; and a counter that is incremented in response to the new event signal.

14. A method for counting event signals generated by a computer system, comprising:

selecting a subset of at least two event signals from a set of event signals generated by the computer system, the at least two event signals being generated concurrently;

generating, in a single clock cycle, combined event signals based on the at least two event signals of the subset in accordance with predefined logic functions;

providing new event signal by selecting one of the combined event signals; and counting, the new event signal during the single clock cycle.

15. The method of claim 14 further comprising:

selecting dynamically while the computer system is operating a new subset of event signals from the set of event signals generated by the computer system.

16. The method of claim 14 wherein the generating generates a plurality of combined event signals from the selected subset of event signals; and further comprising:

selecting one of the combined event signals to count.

17. The method of claim 16 further comprising:

selecting dynamically while the computer system is operating a different one of the new event signals to count.

18. The method of claim 14 further comprising:

generating concurrently a first event signal and a second event signal, the first event signal and second event signal each indicating an occurrence of a particular event; and wherein the selecting a subset of event signals selects the first event signal and the second event signal, and the generating generates the combined event signal based on the first event signal and the second event signal so that each occurrence of the particular event is counted in one counter during a single clock cycle.

19. A method for counting event signals generated by a computer system, comprising:

generating a first event signal and a second event signal;

selecting a subset of at least two event signals from a set of event signals generated by the computer system including the first event signal and the second event signal that is distinct from the first event signal;

combining the selected subset of event signals to generate a new event signal when the second event signal is generated after the first event signal is generated; and counting the new event signal.

20. The method of claim 19 further comprising:

generating a third event signal; and wherein the selecting selects the third event signal, and the combining generates the new event signal when the second event signal is generated after the first event signal unless the third event signal is generated after the first event signal and before the second event signal.

* * * * *

UNITED STATES PATENT AND TRADEMARK OFFICE
CERTIFICATE OF CORRECTION

| | |
|---|---|
| PATENT NO. | : 6,112,318 |
| DATED | : August 29, 2000 |
| INVENTOR(S) | : Jouppi, Norman et al. |

It is certified that error appears in the above-identified patent and that said Letters Patent is hereby corrected as shown below:

<u>Column 19,</u>
Line 51, after "comprising:" begin a new paragraph

<u>Column 20,</u>
Line 41, after "counting" delete the comma

Signed and Sealed this

Twenty-first Day of June, 2005

JON W. DUDAS
*Director of the United States Patent and Trademark Office*